United States Patent
Mielitz

[11] 3,894,405
[45] July 15, 1975

[54] REFRIGERATION UNIT

[76] Inventor: Gustav B. Mielitz, 168 Kennedy St., Johannesburg, South Africa

[22] Filed: Feb. 12, 1974

[21] Appl. No.: 441,750

[30] Foreign Application Priority Data
Nov. 27, 1973 South Africa............ 73/9006
Nov. 27, 1973 South Africa............ 73/9007
Nov. 27, 1973 South Africa............ 73/9008

[52] U.S. Cl................. 62/241; 62/239; 417/231
[51] Int. Cl.²............................ B60H 3/04
[58] Field of Search............ 62/241, 239; 417/231

[56] References Cited
UNITED STATES PATENTS

| | | |
|---|---|---|
| 2,108,391 | 2/1938 | Rice .................................. 261/29 |
| 2,194,530 | 3/1940 | Torstensson ...................... 62/241 |
| 2,570,162 | 10/1951 | Schwebs ............................ 98/6 |
| 2,889,691 | 6/1959 | Schjolin ............................. 62/510 |

*Primary Examiner*—William J. Wye

[57] ABSTRACT

A vapour compression refrigeration unit including at least one vapour compressor connected to a condenser and to an evaporator, the compressor comprising a piston and cylinder assembly adapted for mounting in a vehicle as a shock absorber therefor and to be operated by compressive forces resulting from relative movement of suitable vehicle components.

8 Claims, 8 Drawing Figures

FIG. 3
FIG. 4
AA
FIG. 5
BB
FIG. 6
CC
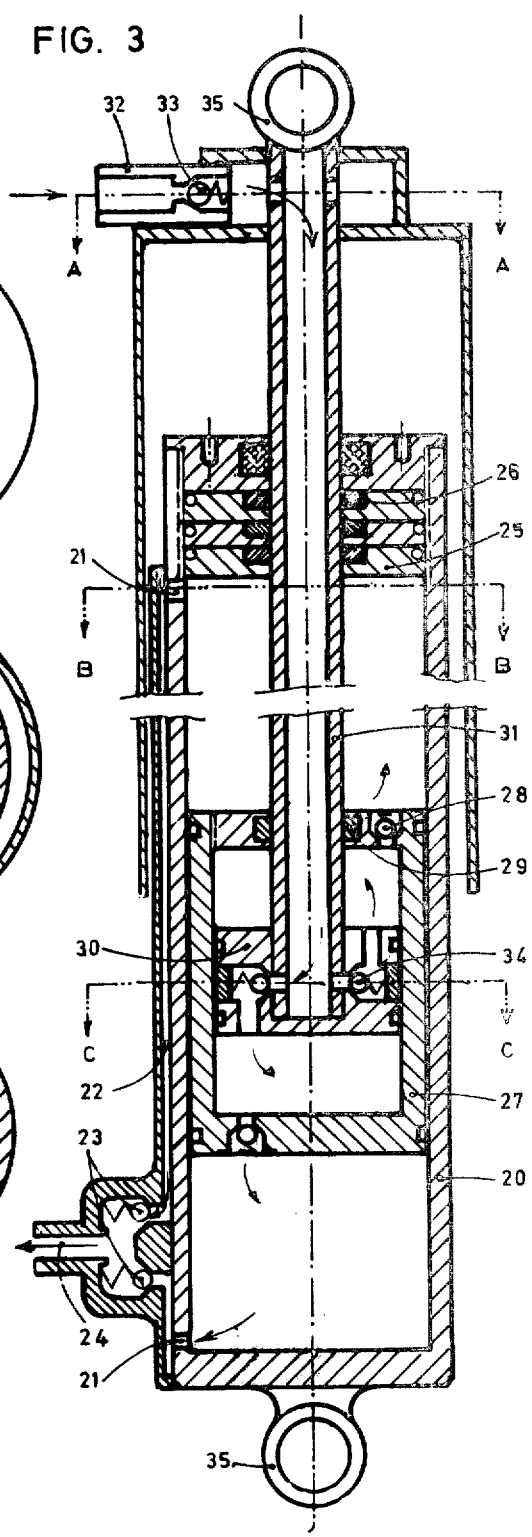
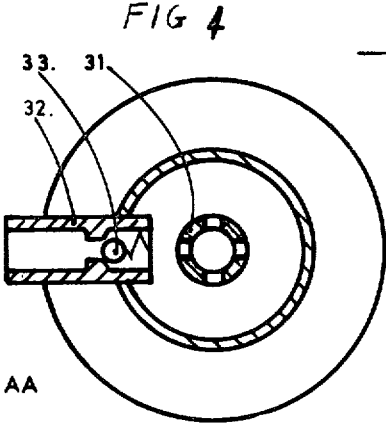
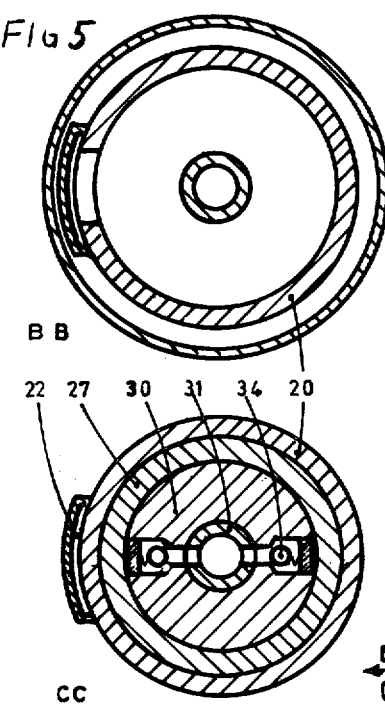

3,894,405

REFRIGERATION UNIT

The present invention relates to a vapour compression refrigeration unit adapted for use with a wheeled vehicle.

It is the object of the present invention to provide a relatively simple vapour compression refrigeration unit which utilises compressive forces encountered in a wheeled vehicle.

In accordance with this invention there is provided a vapour compression refrigeration unit including at least one vapour compressor connected to a condenser and to an evaporator, the compressor comprising a piston and cylinder assembly adapted for mounting in a vehicle as a shock absorber therefor and to be operated by compressive forces resulting from relative movement of suitable vehicle components.

Further features of the invention provide for the compressor to be adapted to act as a shock absorber either in the suspension system of the vehicle or in a buffer coupling system of the vehicle, for the condenser to be adapted for external mounting on the vehicle, for the unit to include an expansion valve, a pressure relief valve and a liquid container, the latter being connected to the condenser and for the unit to optionally include a rotary compressor connected in parallel with the compressor.

The invention also provides a vapour compressor for use with the refrigeration unit defined above, the compressor being a double acting piston and cylinder assembly comprising an outer cylinder having a hollow floating piston slidingly accommodated therein, a piston located in the hollow piston and connected to a hollow piston rod protruding from the hollow piston and the cylinder, suitable inlet and outlet valves and ports in the assembly to allow vaporised refrigerant to be drawn into the hollow piston through the hollow piston rod when the piston moves reciprocally and to allow the refrigerant to be compressed by the piston and discharged from the outer cylinder and formations provided toward the free end of the piston rod and the opposite end of the outer cylinder for attaching the assembly to a wheeled vehicle.

The invention further provides a wheeled vehicle having a refrigeration unit as outlined above mounted thereon with at least one piston and cylinder compressor assembly being mounted in place of or in addition to existing shock absorbers of the vehicle. These and other features of the invention will become apparent from preferred embodiments thereof which are now described by way of example.

In these embodiments reference is made to the accompanying drawings in which:

FIG. 3 is a cross-sectional side elevation of a compressor for the refrigeration unit;

FIGS. 4, 5 and 6 are cross-sectional plan views along A—A, B—B and C—C respectively of the compressor shown in FIG. 3;

In the embodiments of the present invention a vapour compression refrigeration unit is adapted for use with a motor vehicle to utilise the compressive and expansive forces encountered in the suspension systems thereof.

Figure 1:
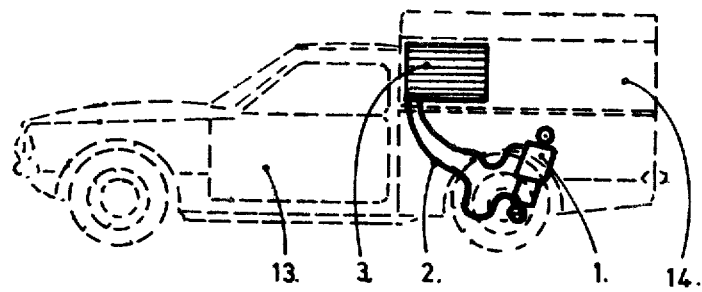
FIG. 1 is a diagrammatic representation of an embodiment of the present invention operatively installed in a motor vehicle.
Figure 2:
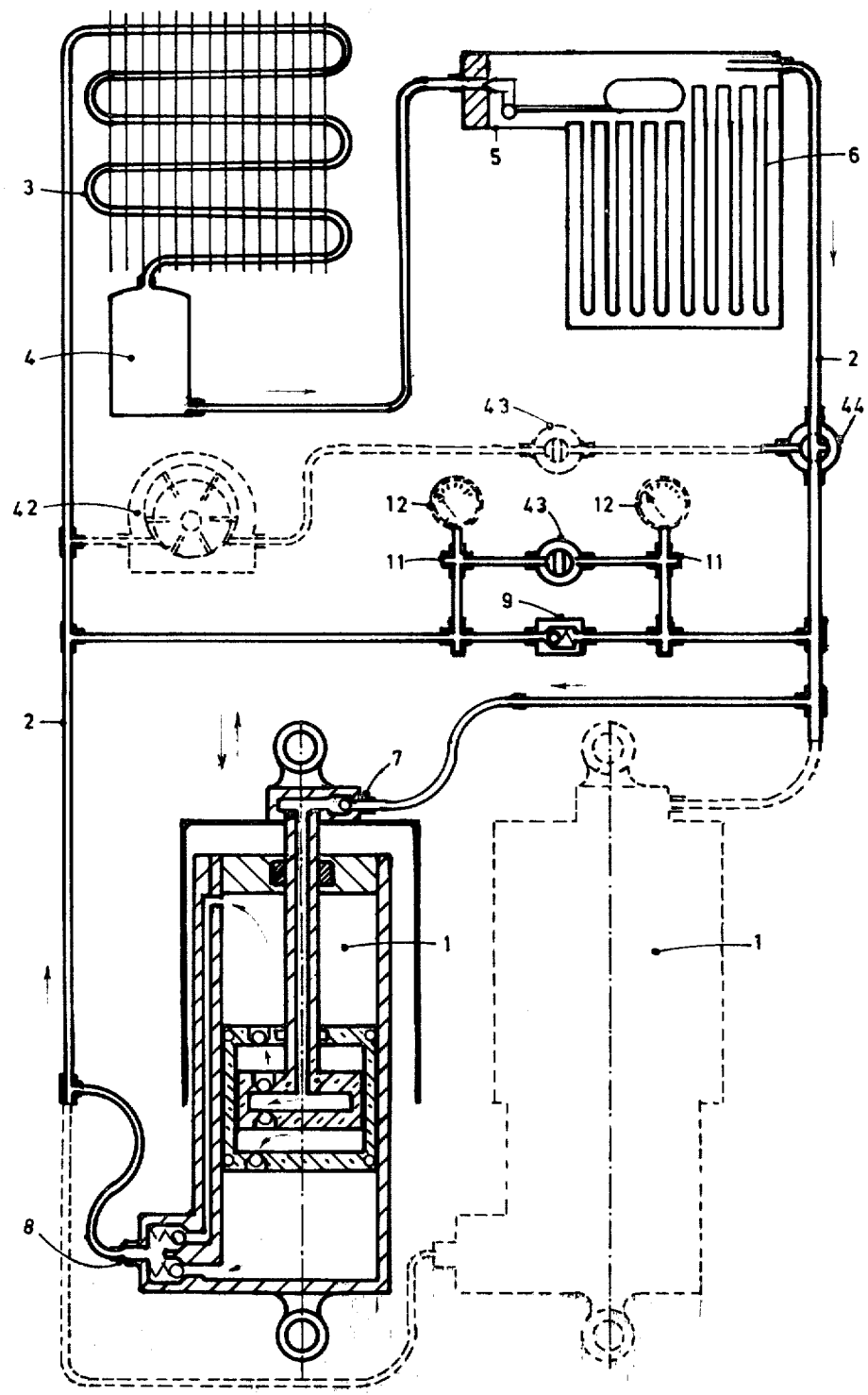
FIG. 2 is a diagrammatic representation showing alternative refrigeration units.

With reference to FIG. 1 and to the parts of FIG. 2 in heavy lines, a refrigeration unit with an operating cycle utilising a flooded expansion system with a float valve on the low pressure side, comprises a compressor 1 for compressing vaporised refrigerant prior to condensing the refrigerant. The outlet 8 of the compressor is connected by means of piping 2 to a condensor 3 whose outlet is connected to a liquid container 4 in turn connected to an expansion valve 5 including a float valve and to an evaporator 6 in which liquid refrigerant can evaporate and cause cooling in known manner.

Connected between the inlet 7 for the compressor 1 and the outlet 8, that is between the low and high pressure sides of the compressor, is a pressure regulator assembly comprising a pressure relief valve 9, a temperature control solenoid valve 43 and service valves 11 fitted with pressure gauges 12. The control valve 43 and pressure relief valve are connected in parallel and the former operates thermostatically and is opened to equalise the pressure between the low and high pressure side of the unit.

The components of the unit outlined above are assembled and a fluorocarbon or other commercially available low pressure refrigerant is introduced into the circuit which circulates in known manner to produce a cooling effect.

It is envisaged that this refrigeration unit will be marketed in assembled form for mounting onto a motor vehicle. The compressor, described more fully below, is adapted for use as a shock absorber in a vehicle suspension system. With reference to FIG. 1, the unit is mounted on a relatively light weight motor truck 13 with the compressor 1 being mounted in place of or in addition to the rear shock absorbers of the truck. The condenser 3 is mounted externally such that it will be cooled during motion by the airflow around it and the evaporator is mounted inside a compartment 14 of the truck which is to be cooled.

Relative movement between the road wheels and the chassis of the truck as the wheels move over bumps and undulations in a road supply the power necessary for operating the compressor. The compressor thus serves a dual purpose, that is, to compress vapourised refrigerant and to act as a shock absorber. The piping 2 to the inlet and/or outlet of the compressor may be flexible to allow for the relative movement of parts of the compressor in use. A protective cover may be suitably attached around the condenser.

In use liquid refrigerant condensed in the condenser flows into the liquid container 4. The liquid then flows to the expansion valve which maintains a pressure difference between the condenser and the evaporator and opens the expansion valve only when a predetermined liquid level is attained. The pressure relief valve 9 relieves any excessive pressure in the unit and the temperature control valve equalises the pressures on the inlet and outlet sides of the compressor when opened.

The compressor 1, within the scope of the present invention is now described with reference to FIGS. 3, 4, 5 and 6. The compressor is a double-acting piston and cylinder assembly and comprises a closed pressure cylinder 20 with outlet ports 21 in each end of the side wall. Ducting 22 connecting these ports to two non-return outlet valves 23 terminates in a single outlet connection 24. The top end cover 25 of the cylinder has a central axial aperture therethrough fitted with shaft seals 26. Sliding sealingly inside the bore of the pressure cylinder is a hollow cylindrical floating piston 27 with closed ends and non-return outlets 28 in both ends. The top end of the floating piston has a central axial aperture therethrough fitted with a shaft seal 29. Sliding sealingly inside the smooth bore of the floating piston is another piston 30 connected to a hollow piston rod 31 which passes out through the shaft seals 29 and 26 in the pressure cylinder and the floating cylinder respectively. The rod terminates at an inlet connection fitting 32 at the top of the piston rod provided with a non-return valve 33. The bore of the hollow piston rod is in communication with non-return outlet valves 34 in both piston faces. At the top and bottom of the compressor are fittings 35 for attaching the compressor in a vehicle suspension system as outlined above.

When operatively installed, reciprocating telescopic movements of the compressor draw refrigerant vapour in through the hollow piston rod 31 and out through the non-return valve 34 into the floating cylinder. The charge gets compressed by the piston on the return stroke and discharged into the pressure cylinder while a fresh charge is drawn into the opposite chamber. With longer movements the floating piston moves with the piston 30 and larger quantities of vapour are compressed and discharged through the outlets.

Figure 7:
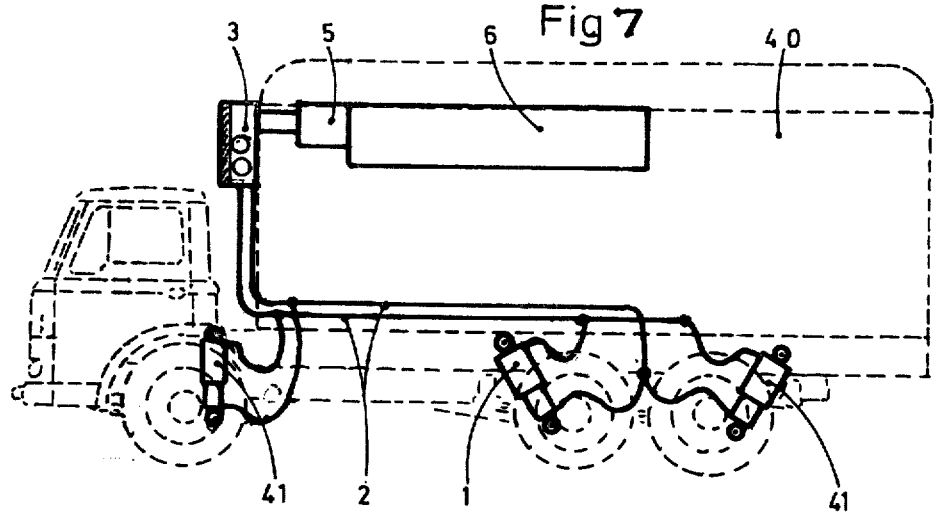
FIG. 7 is a diagrammatic representation of an alternative embodiment of the invention operatively installed in a transport vehicle.

With reference to FIG. 7 and FIG. 2, including the sections shown in ghosted lines, an alternative embodiment of the invention is now described. This embodiment is substantially the same as that outlined above but is proposed for larger applications.

In this case the refrigeration unit is used with a bulk transport vehicle 40 having an insulated freight compartment and further compressors 41 are included in the unit and mounted in the vehicle suspension system as shown in FIG. 4 to act as shock absorbers therefor. The compressors are interconnected in parallel and a pressure relief valve 9 and service valves 11 with pressure gauges 12 are connected between the inlet and outlet to the compressor assembly.

An electrically driven rotary compressor 42 is included in the unit and connected in parallel with the interconnected compressors 1 and 41. A solenoid temperature control valve 43 is connected to the inlet of the rotary compressor and a three-way control valve 44 is provided as shown in FIG. 2 to allow the rotary compressor to be used when the vehicle is stationary.

Apart from these latter aspects of this embodiment, the functioning of the refrigeration unit described above is substantially the same as in the first embodiment. In this case the various components of the unit will be marketed separately and the number and size of installed components can be varied according to the cooling requirements for the vehicle and the suspension characteristics thereof.

Figure 8:
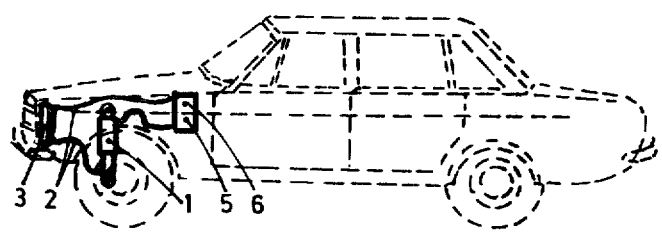
FIG. 8 is a diagrammatic representation of a further embodiment of the present invention.

With reference now to FIG. 8, a further embodiment of the present invention is described. In this case the refrigeration unit according to this invention is mounted in a passenger motor car and is adapted to cool the passenger compartment thereof. The condenser 3 is mounted beneath the motor car bonnet in front of or to the one side of the radiator thereof. The exact mounting position of the condenser will depend on the make of vehicle and the space available in the engine compartment.

The evaporator 6 is mounted in the proximity of the internal ventilation system of the motor car such that it is located in the path of the normal ventilation air flow into the passenger compartment and compressors 1 replace the front wheel suspension shock absorbers.

The components are connected generally as described above and the method of operation of the unit is apparent.

Alternative embodiments of the invention are possible within its scope. For example, piston and cylinder compressors could be mounted in the buffer coupling assemblies of rail or road vehicles and the other components would be suitably mounted on such vehicles. The compressors and hence the refrigeration unit would then be operated by the longitudinal compressive and expansive forces encountered in a train of trucks or in an articulated horse and trailer assembly.

In all cases the compressors included in the unit can be suitably mounted in the associated vehicle to entirely replace or merely supplement the existing shock absorber arrangement. Furthermore, the invention is not confined in scope to a flooded expansion system with a "low side" float controlled valve. A dry expansion system with a compensated pressure regulating expansion valve or other suitable systems could successfully be employed.

The refrigeration unit described above is relatively simple in conception and yet operates effectively in an inexpensive manner since it utilises, at least partly, superfluous energy generally wasted in wheeled vehicles.

What I claim as new and desire to secure by letters Patent is:

1. A vapour compressor adapted for mounting between first and second relatively movable vehicle components and to be operated by forces resulting from such movement comprising:

an outer cylinder defining an outer vapour chamber, said outer cylinder being connected to said first movable vehicle component, said outer chamber being closed by first end walls, a hollow floating piston slidably mounted in said outer chamber, the interior of said hollow floating piston defining an inner vapour chamber, said inner chamber being closed by second end walls, an inner piston slidably mounted in said inner chamber, a hollow piston rod connected to said inner piston and to said second relatively movable vehicle component, said hollow piston rod having a vapour passage communicating on the one hand with the exterior of said compressor and on the other hand with said inner chamber, said hollow piston rod extending through a piston rod opening in an end wall of each of said outer and said inner chambers, first valve means for controlling the flow of vapour between said passage and said inner chamber, second valve means for controlling the flow of vapour between said inner chamber and said outer chamber, and third valve means for controlling the flow of vapour between said outer chamber and the exterior of said compressor, whereby relative movement of said first and second vehicle components of a first magnitude causes vapour to be compressed in said inner chamber and relative movement of said first and second vehicle components of a second magnitude greater than said first magnitude causes vapour to be compressed in said outer chamber and said inner chamber.

2. The compressor of claim 1 wherein said first, second and third valve means are all one-way valves, so oriented as to allow vapour flow from said passage into said inner chamber, from said inner chamber into said outer chamber, and from said outer chamber to the exterior of said compressor.

3. The compressor of claim 1 further comprising fourth valve means for controlling the flow of vapour between the exterior of said compressor and said vapour passage.

4. The compressor of claim 3 wherein said fourth valve means is in communication with refrigerant evaporator means and said third valve means is in communication with refrigerant condenser means.

5. The compressor of claim 1 wherein said inner piston is double acting and said first valve means provides communication between said passage and said inner chamber on both sides of said piston, wherein said floating piston is double acting and said second valve means provides communication between said inner chamber and said outer chamber on both sides of said floating piston, and wherein said third valve means provides communication between said outer chamber on both sides of said floating piston and the exterior of said compressor.

6. A vapour compression refrigeration unit including at least one vapour compressor as set forth in claim 1, and further comprising an evaporator communicating with said vapour passage and a condenser communicating with said third valve means.

7. A vapour compression refrigeration unit as set forth in claim 6, and further comprising an expansion valve, a pressure relief valve, and a liquid receiver connected to said condenser.

8. A vapour compression refrigeration unit including at least one vapour compressor as set forth in claim 1, and further comprising a liquid receiver and a driven rotary vapour compressor, said vapour compressor and said driven rotary vapour compressor being in parallel, and being connected to a liquid receiver.

* * * * *